Aug. 31, 1943.  F. SPORTOLARI  2,328,508
APPARATUS FOR FORMING COATED FROZEN CONFECTIONS
Original Filed May 6, 1941   2 Sheets-Sheet 2
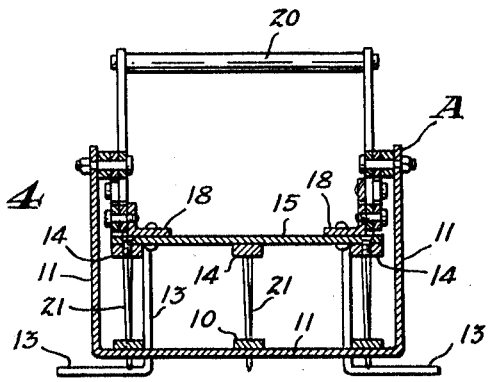
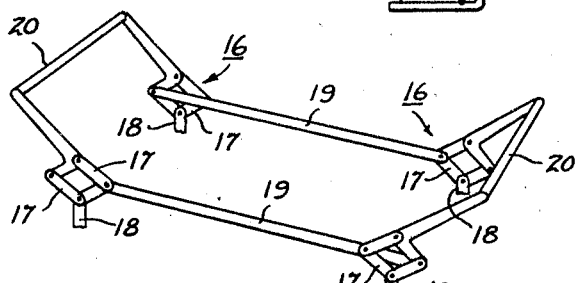
INVENTOR
*Frank Sportolari*
BY
ATTORNEY Patented Aug. 31, 1943

2,328,508

UNITED STATES PATENT OFFICE 2,328,508

APPARATUS FOR FORMING COATED FROZEN CONFECTIONS

Frank Sportolari, Pittsburgh, Pa.

Original application May 6, 1941, Serial No. 392,083. Divided and this application May 8, 1942, Serial No. 442,161

5 Claims. (Cl. 294—87)

This invention relates to new and useful improvements in apparatus for making frozen confections, and more particularly for filling and coating edible ice cream cones.

It is among the objects of the invention to provide an improved handling device used in making a plurality of chocolate coated cones simultaneously in an expedient and economical manner, and with complete sanitation, as it eliminates the need for handling the individual cones.

A further and more specific object of the invention is the provision of improved apparatus for handling the cones for dipping and coating operations.

Frozen confections of the type herein referred to have heretofore been produced by handling each cone individually. By the hand method the cone was filled with the substance to be frozen and charged in racks which were placed in a freezing room. After freezing they were partially dipped in a coating solution and then rolled in grated nuts or the like. Because of the time lost in handling the cones to fill them and transfer them to a freezing chamber, it was necessary to coat the inside and outside of the cone with a chocolate coating containing a fatty substance to render the cone moisture repellant, to prevent its becoming soggy after the substance to be frozen is placed therein. Such pre-coating is not necessary when the device of the present invention is used in carrying out the hereinafter disclosed method because of the rapidity of filling, freezing and transferring the filled cones.

The invention will become more apparent from a consideration of the accompanying drawings constituting a part hereof, in which like reference characters designate like parts, and in which:

Fig. 4 is a cross sectional view, taken substantially on line 4—4 of Fig. 3; and Fig. 5 is a fragmentary perspective view showing the handles and actuating mechanism of the impaler or confection handling device.

Figure 1:
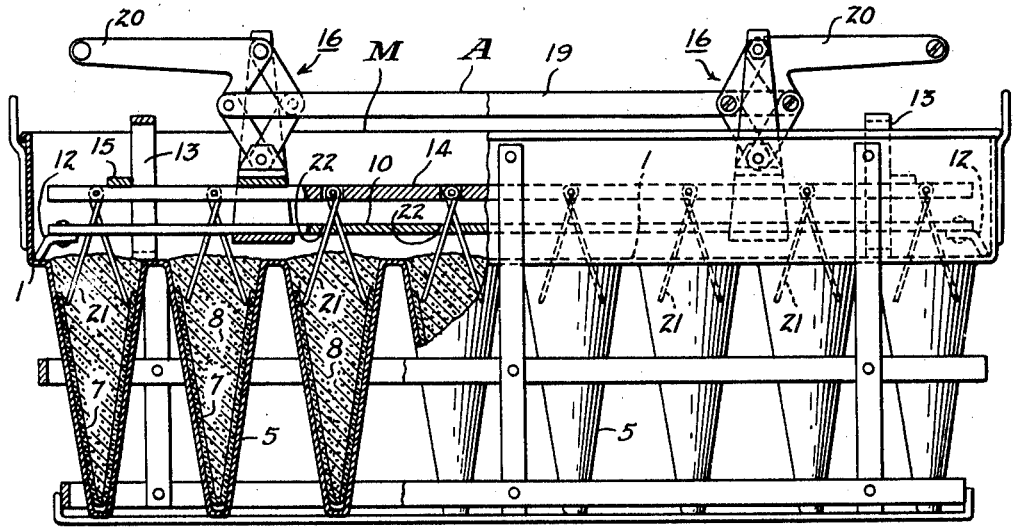
Figure 1 is a side elevation, partially in cross section, of the rack or impaler of the present invention placed on a suitable confection mold, with parts broken away to illustrate the operations thereof.

Open ended containers 7, such as ice cream cones made of an edible frangible material and filled with a suitable comestible substance, indicated by the numeral 8, such as a plastic ice cream mix or the like, are subjected to a low temperature to chill the container and solidify or freeze the substance. After the filled cones are suitably frozen in mold M, they are removed by means of a gripper rack or impaler A which comprises a body portion or member composed of a plurality of flat bars 10 disposed in parallel relation and secured together by attachment to the crosspieces of U-shaped brackets 11. In the construction shown in the drawings, three of the bars 10 are employed and are held in place by a pair of the brackets 11, which are spaced apart and located near the ends of the bars 10.

The body of the impaler is provided with suitable support means or chairs 12, which extend in an outward direction from the ends of the bars 10, so that the impaler may be supported at its ends in the pan 1 of the mold M and will overlie the individual molds 5. The supports 12 also act as guides for the ends of the impaler as it is being moved into and out of the pan 1 of the mold. Additional supports for the body of the impaler are provided by handle members 13, the ends of which extend outwardly from the sides of the body in substantially the same plane as the supports 12, and act as guides for the sides of the body as well as supports therefor. The intermediate portions of the members 13 extend upwardly above the bars 10 of the body to provide handles for the impaler.

Above the body of the impaler A is provided suitable means for carrying the impaling elements which, in the construction shown in the drawings, comprises three flat bars 14, similar to the bars 10, and disposed in superposed relation to the bars 10. The bars 14 are secured to crossbars 15, so that the bars 14 move and act as a unit.

The carrying means for the impaling elements is connected for vertical movement toward and away from the body of the impaler through toggle mechanisms, two of which are at each side of the impaler, and are indicated generally by the numeral 16. These toggle mechanisms include toggle links 17 which are pivotally connected to each other, the lower end of each toggle being connected to a bracket 18 carried by the ends of two of the crossbars 15 of the means carrying the impaling elements, and the upper end of each toggle being connected to the upwardly extending free ends of the U-shaped brackets 11 to which the bars 10 are secured. The two toggles at each side of the impaler are interconnected by links 19, so that all the toggles operate simultaneously. As may be seen in the diagrammatic perspective of the toggles in Fig. 5, one of the links 19 connects the inside of one toggle to the outside of the other toggle on the same side, while the other link 19 connects the outside of the toggle which is across from the toggle connected on the inside to the inside of the toggle across from the toggle connected at its outside. Handles 20 extend transversely across from the two toggle mechanisms at each end of the impaler and provide a means to actuate the toggles and move the impaling elements toward and from the impaler body.

At spaced locations along the bars 14, suitable impaling elements 21 are secured, which in the present instance are formed wires mounted in apertures in the bars 14 and having two free ends depending from the bars and crossing each other at a short distance beneath the bars. These crossed wires extend downwardly to the bars 10 and are received in suitable guide slots 22 provided in the bars 10. The guide slots 22 are flared in an outward direction so that as the bars 14 and the impaling wires 21 are moved toward the bars 10, the ends of the wires 21 are directed downwardly and outwardly to impale the solidified comestible substance 8 at the open end of the cones 7, and grippingly engage the confections to lift them from the molds 5.

Figure 2:
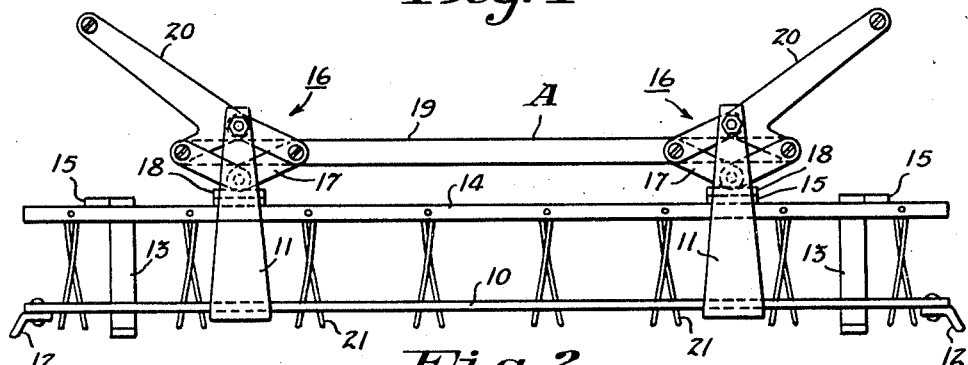
Fig. 2 is a side elevational view of the handling device showing the impalers in retracted positions.
Figure 3:
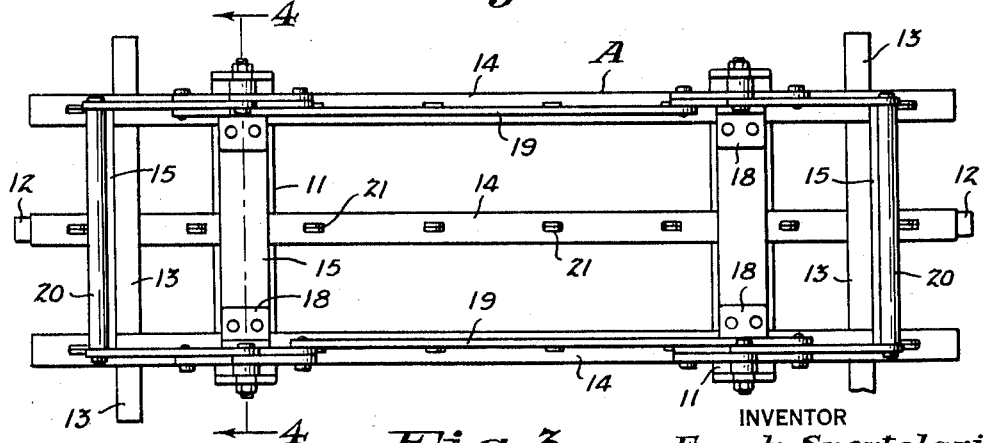
Fig. 3 is a top plan view of the impaling device shown in Fig. 2.

Figs. 2 and 4 show the impaler A with the wires 21 withdrawn to their normal or inoperative position. Fig. 1 illustrates the rack or impaler with the handles 20 pulled outwardly and downwardly to actuate the toggles and extend the points of the impaling elements 21, causing them to grippingly engage confections. By simply raising the rack A by the handles 13, the confections 7 may be simultaneously removed from their molds.

When the confections are removed from the mold M by the impaler A and transferred to a holder, such as the holder H shown in my application hereinafter identified, the handles 20 of the impaler A may be moved upwardly and toward each other to retract the impaling wires 21 from the confections and the impaler A is free to be used in removing the next group of confections from their mold M.

The above described impaler mechanism or handling device is used in the forming of frozen confections, as follows:

The mold M is placed in an upright position, and the cones, which are of a crisp edible wafer substance, are dropped in the molds 5 and the substance 8 to be frozen is then poured into the individual cones. The mold M is then subjected to rapid refrigeration by standing the mold in a brine solution or by placing it in a refrigerated compartment. The frozen cones are then removed from their molds by gripping the stationary handles 13 and placing the impaler A in the bottom of the mold pan 1, as shown in Fig. 1, with the toggle handles 20 in their raised position, as shown in Fig. 2. In this position the impaling elements 21 are retracted and are disposed above the contents of the molds 5. By depressing the toggle handles 20, the impaling wires are moved downwardly and outwardly, while they move into the frozen substance 8 with which the cones are filled. By again gripping the handles 13 and lifting the impaler A out of the mold pan 1, all of the frozen units will be simultaneously removed from their molds. To facilitate the removal of the cones, the mold may be dipped in warm water for an instant, causing defrosting of the walls of the mold and permitting the removal of the cones therefrom.

When the impaler A is lifted out of the mold with the frozen cones suspended from the wires 21, it is placed over a suitable holder having individual sockets to receive the cones and the gripper rack A is then removed or released by actuating the toggle handles 20 to withdraw the impaling wires 21 from the frozen confections.

It is evident from the foregoing description of this invention that the apparatus disclosed provides an economical and sanitary means of making frozen ice cream cone confections without the need of handling with unsanitary utensils and in unsanitary surroundings, and without the hands of a person coming in contact with any part of the frozen confection.

By the herein described method of simultaneously handling a large number of cones and by the rapid freezing of the filling substance, it is not necessary to coat the inside and outside of the cone before placing it in the mold, although this may be done if desired. The elimination of this step, however, effects a substantial saving both in the use of materials and in the additional time needed for the dipping and handling operations.

This application is a division of my copending application, Serial No. 392,083, filed May 6, 1941, for Method for forming coated frozen confections.

While the above apparatus has been described in connection with a certain type of confection, it may be seen that slight variations in the apparatus may be made to handle other similar confections without departing from the spirit of the present invention.

Although one embodiment of the invention has been herein illustrated and described, it will be evident to those skilled in the art that modifications may be made in the details of construction or in the steps of the method without departing from the principles herein set forth.

What I claim is:

1. Apparatus for handling confections which comprises a relatively flat member, means disposed above said member for carrying a plurality of impalers in spaced relation, activating means including a toggle mechanism carried by said member to cause movement of said carrying means toward and from said member, a plurality of impalers mounted on said carrying means, and guide means carried by said member to receive the impalers and upon movement of the activating means in one direction to cause divergence of the impalers to grippingly engage confections, and upon movement of said activating means in the opposite direction to release the confections.

2. Apparatus for handling confections which comprises a relatively flat member, a wire carrying member disposed above the flat member, a plurality of spaced guides in the flat member, a plurality of wires secured to the wire carrying member, spaced supports carried by the flat member, means mounted on said supports for causing vertical movement of said wire carrying member bodily and uniformly relative to said flat member, said guides being flared for receiving the ends of the wires so that upon movement of the wire carrying member the wires are guided downwardly and flared outwardly to grippingly engage confections and upon return movement of the wire carrying member the confections are released.

3. Apparatus for handling confections which comprises a body member having supports therefor extending outwardly from spaced locations about the periphery of the body, impalers disposed above said body, said impalers including a plurality of depending impaling elements, actuating mechanism for said impalers carried by said body and adapted to move said impalers with respect to said body, and guide means carried by said body to receive said impaling elements, said guide means including portions flared in the direction of movement of the impalers, so that upon movement of the impalers toward the body the impaling elements diverge to grippingly engage a confection and upon movement of the impalers away from the body the impaling elements converge to release the confection.

4. Apparatus for handling confections which comprises a body member having supporting means extending outwardly therefrom at spaced locations about the periphery of the body, a plurality of impalers disposed above said body, each of said impalers including a plurality of impaling elements, a manually actuatable means including a toggle mechanism carried by said body and adapted to move said impalers with respect to the body, and guide means carried by the body to receive impaling elements, said guide means including flared portions so that upon movement of the impalers toward the body the impaling elements diverge to grippingly engage confections and upon movement of the impalers away from the body of the impaling elements converge to release the confections.

5. A manually actuated gripping and transfer device for handling frozen confections to simultaneously lift a plurality of frozen cones from the forming mold, comprising a plurality of horizontally disposed bars in parallel and superposed relation, some of the lower bars being provided with seating chairs, a plurality of supporting brackets attached to the bottom bars, a toggle mechanism attached to the upper bars and pivoted to the supporting brackets, handle members on said toggle mechanism for actuating the toggle to subject the upper bars to vertical movement relative to the lower bars, said handle members constituting grips for handling the mechanism, said lower bars having wire guides and said upper bars having wires attached thereto, the guides in the lower bars being flared for receiving the ends of the wires of the upper bars so that upon movement of the upper bars the wires are forced downward and flared outwardly to grippingly engage the frozen confections, and upon return movement to automatically release the said confection.

FRANK SPORTOLARI.